(12) United States Patent
Saliba et al.

(10) Patent No.: US 8,432,251 B2
(45) Date of Patent: Apr. 30, 2013

(54) SECURE BIOMETRIC DEVICE

(75) Inventors: Eric Saliba, Chatou (FR); François Dufresne De Virel, Paris (FR)

(73) Assignee: Morpho, Paris (FR)

( * ) Notice: Subject to any disclaimer, the term of this patent is extended or adjusted under 35 U.S.C. 154(b) by 940 days.

(21) Appl. No.: 12/525,637

(22) PCT Filed: Feb. 12, 2008

(86) PCT No.: PCT/FR2008/000175
§ 371 (c)(1),
(2), (4) Date: Aug. 3, 2009

(87) PCT Pub. No.: WO2008/129147
PCT Pub. Date: Oct. 30, 2008

(65) Prior Publication Data
US 2010/0127826 A1 May 27, 2010

(30) Foreign Application Priority Data
Feb. 14, 2007 (FR) ..................... 07 01082

(51) Int. Cl.
*G06F 7/04* (2006.01)
(52) U.S. Cl.
USPC ............. 340/5.82; 340/1.1; 340/5.1; 340/5.8; 340/5.81; 340/5.83; 382/115; 382/127; 396/14; 396/16; 396/18
(58) Field of Classification Search .......... 340/5.82, 340/1.1, 5.1, 5.8, 5.81, 5.83, 5.52–5.53; 382/115–127; 348/77; 396/14–18; 902/3; 358/474
See application file for complete search history.

(56) References Cited

U.S. PATENT DOCUMENTS
7,148,466 B2 * 12/2006 Eckman et al. ............... 250/221
2004/0085188 A1 5/2004 Minemura FOREIGN PATENT DOCUMENTS
| DE | 197 05 518 | 8/1998 |
| EP | 0 786 745 | 7/1997 |
| EP | 1 434 162 | 6/2004 |
| WO | WO 2006070119 A2 * | 7/2006 |

* cited by examiner

*Primary Examiner* — George Bugg
*Assistant Examiner* — Sisay Yacob
(74) *Attorney, Agent, or Firm* — Muncy, Geissler, Olds & Lowe, PLLC

(57) ABSTRACT

A device for capturing biometric characteristics, the device having an optical sensor with a field of view covering a detection zone for detecting optical characteristics, and an electronic control unit that is connected to the sensor in order to control it, the control unit being placed at least in part in the field of view of the sensor and includes a memory containing at least one signature resulting from at least one reference optical characteristic of the control unit as seen by the sensor, and a comparator module for comparing the signature with at least one corresponding signature that results from at least one optical characteristic of the control unit as supplied by the sensor.

17 Claims, 3 Drawing Sheets

SECURE BIOMETRIC DEVICE

The present invention relates to a device for capturing an image of a fingerprint, of an iris of an eye, of a face, or of some other body part, e.g. for purposes of identifying or authenticating a person having the body part that appears in the image.

BACKGROUND OF THE INVENTION

In general, an optical biometric capture device comprises an optical sensor such as a camera and an electronic control unit connected to the sensor in order to control it. The control unit is arranged to control image capture by the sensor, image processing, and extracting characteristics concerning the captured body part for the purposes of:
- comparing them with characteristics stored in the device or imported via secure external communication; or
- exporting them to a comparator device via secure communication.

The comparison serves to identify the person to whom said body part belongs or to verify that the characteristics of the body part appearing in the image do or do not belong to one of the people authorized to access a premises or a service. A dishonest person may attempt to act on the control unit to access its comparison algorithms or its encoding algorithms used for enciphering the characteristics prior to exporting them, or more generally to access operating parameters of the control unit. The control unit is therefore one of its central components of the device, and it needs to be made secure in order to prevent any action being taken thereon by a non-authorized person seeking to falsify identification or authentication.

It is known for the control unit to have incorporated therein a passive protection element such as a resin, or an active protection element such as a resistive film or mesh (see for example documents FR-A-2 805 074 and FR-A-2 824 697) so that any unauthorized physical alteration or manipulation on the control unit leads to an alteration of the protection element that reveals the intervention. Nevertheless, that solution is not practical, for example because it introduces constraints on the design of the device (overall size, position), of compatibility with light rays, and of passages for cables or electrical harnesses, that require discontinuities in the protection element and thus potentially provide access to the protected elements.

OBJECT OF THE INVENTION

An object of the invention is to propose a capture device that is protected against unauthorized interventions thereon.

SUMMARY OF THE INVENTION

To this end, the invention provides a device for capturing biometric characteristics, the device comprising an optical sensor having a field of view covering a detection zone for detecting biometric characteristics, and an electronic control unit that is connected to the sensor in order to control it. The control unit is placed at least in part in the field of view of the sensor and includes a memory containing at least one signature resulting from at least one reference optical characteristic of the control unit as seen by the sensor, and a comparator module for comparing the signature with at least one corresponding signature that results from at least one optical characteristic of the control unit as supplied by the sensor.

Thus, the sensor can detect optical characteristics of the control unit that themselves form a signature or from which it is possible to generate a signature. Comparing a stored signature with a signature that results from optical characteristics that are detected subsequently thus makes it possible to reveal an alteration in said optical characteristics. In the event of an intervention on the control unit, the signature that results from the optical characteristics provided by the sensor is different from the stored signature, such that comparing signatures reveals the intervention. Using the biometric characteristics sensor makes it possible to avoid any need to add a sensor that is dedicated to detecting the intervention, thereby making the structure of the device simpler, more compact, and less expensive.

Preferably, the comparator module is also arranged to compare biometric characteristics extracted from images provided by the sensor with stored biometric characteristics.

Thus, the comparator module serves simultaneously to check biometric characteristics and to verify the integrity of the control unit. As a result there is no dedicated comparator module, thereby simplifying the structure of the device and making it compact and relatively inexpensive.

In a preferred embodiment, the device includes a mirror placed between the sensor, the control unit, and the detection zone, and arranged to enable the control unit and the detection zone to be viewed, one in reflection and the other in transmission, the mirror preferably being a semi-reflecting mirror.

The use of the mirror gives greater freedom in positioning the control unit relative to the sensor.

Advantageously, the device includes a reflecting member surrounding at least part of the control unit, the reflecting member preferably comprising a plurality of reflecting facets forming angles between one another so as to provide the sensor with different angles of view of the control unit.

The reflecting member enables the sensor to detect the optical characteristics of the control unit simultaneously with different viewing angles.

Also advantageously, the control unit is covered in a protective layer having optical characteristics that are detectable by the sensor. Preferably, the protective layer is made of a non-opaque material incorporating optically detectable elements comprising reflecting flakes, at least one element for illuminating the control unit, more preferably being embedded in the protective layer, and still preferably, the material of the protective layer being viscous.

The protective layer serves to amplify visually any traces that a non-authorized intervention might leave on the control unit. The term "optically-detectable element" is used to mean any element capable of emitting, re-emitting, or reflecting a light flux, in particular when illuminated by an external source or that is itself an emitter of light flux.

According to two particular aspects of the invention:
- the device includes a plurality of lighting elements for lighting the control unit and controlled by the comparator module to take on different configurations, each corresponding to at least one stored signature; and
- the memory contains a plurality of signatures resulting from a plurality of reference optical characteristics, and the comparator module is arranged to select a stored signature, to isolate the corresponding optical characteristics from amongst those detected by the sensor, and to compare at least one signature resulting from the optical characteristics detected by the sensor with the selected stored signature.

Thus, the comparison applies to a selected one of the signatures, possibly a randomly selected signature, in such a manner that it is possible to have a large number of signatures in memory with a reasonable comparison duration, so that a fraudulent person cannot determine which optical characteristics of the control unit are to be used for the signature that is to be compared with the selected memorized signature. This makes it more difficult to carry out a non-authorized intervention on the control unit without that being detected.

Other features and advantages of the invention appear on reading the following description of a particular and non-limiting embodiment of the invention.

BRIEF DESCRIPTION OF THE DRAWINGS

Reference is made to the accompanying drawings, in which.

DETAILED DESCRIPTION OF THE INVENTION

Figure 1:
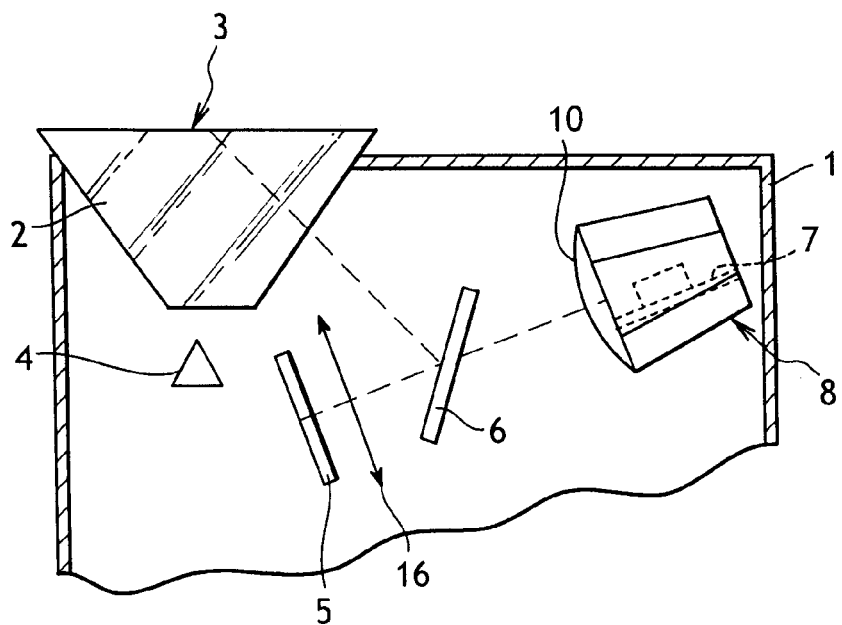
FIG. 1 is a diagrammatic side and section view of a capture device constituting a first embodiment of the invention.
Figure 2:
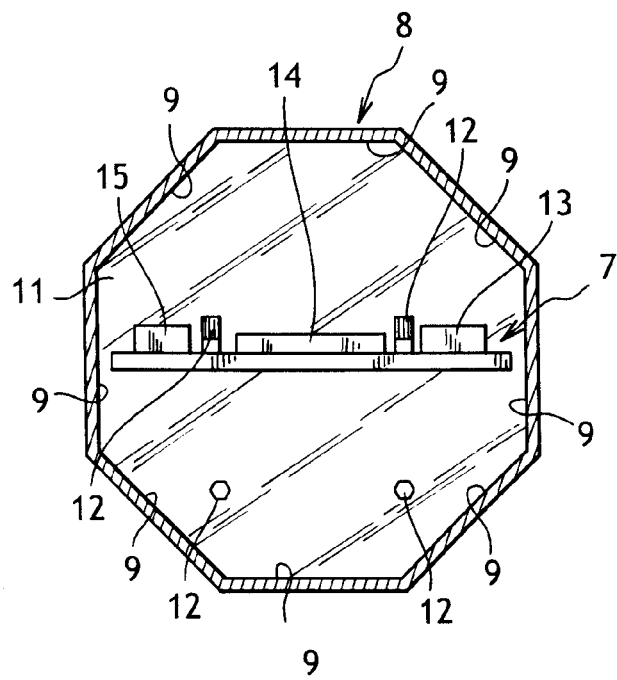
FIG. 2 is a front view of the control unit of the device on a larger scale.

With reference to FIGS. 1 and 2, the capture device constituting the first embodiment of the invention is shown arranged to perform identification by recognizing fingerprints.

The device comprises a casing 1 having a prism 2 mounted thereon in known manner, the prism having a top surface that serves as a surface against which a candidate for identification presses a finger. The top surface of the prism 2 is thus the fingerprint detection zone 3.

A light source 4 is located under the prism 2 for illuminating the detection zone 3.

The capture device includes a sensor 5, in this example forming part of a camera (not shown), that is located so that the sensor 5 has a field of view covering the detection zone 3.

A semi-reflecting mirror 6 is placed between the sensor 5 and the prism 2, in the field of view of the sensor 5, so as to define a light path between the sensor 5 and the detection zone 3 so that the detection zone 3 lies within the field of view of the sensor 5 after reflection on the mirror 6. The mirror 6 is arranged to reflect light rays at wavelengths lying within a first range of values, and to transmit light rays having wavelengths lying in a second range of values.

The positioning of the prism 2, the sensor 5, and the mirror 6 is itself known. An optical focusing element 16 is disposed between the sensor 5 and the mirror 6 to focus the image of the detection zone 3 on the sensor 5.

The capture device also includes an electronic control unit 7 that is connected to the sensor 5 and to the light source 4.

The control unit 7 is disposed on the side of the mirror 6 opposite from the sensor 5 so that the control unit 7 lies in the field of view of the sensor 5 for light that is transmitted through the mirror 6.

The control unit 7 is placed in a cavity in a reflecting member 8 having reflecting facets 9 arranged as a truncated pyramid on a polygonal base. The cavity is closed by a lens 10 arranged to focus the image of the control unit 7 on the sensor 5. The cavity of the reflecting member 8 is filled with a resin in which the control unit 7 is embedded, thereby forming a protective layer 11 around it. The resin in this example is viscous, transparent, and incorporates optically detectable elements, specifically reflecting flakes that are dispersed randomly in the resin. The protective layer 11 thus possesses characteristics that are optically detectable by the sensor 5. Light-emitting diodes (LEDs) 12 are disposed in the cavity and they are embedded in the resin of the protective layer 11. In this example, some of the diodes 12 are mounted directly on the control unit 7 while others are placed at a distance from the control unit 7 (however all of them could be mounted on the control unit 7 or all of them could be at a distance therefrom). The LEDs 12 are elements for illuminating the control unit 7 and they are connected to the control unit 7.

The control unit 7 has a memory 13 containing a database associating fingerprint characteristics with the identities of their proprietors, and a processor module 14, specifically a processor that is arranged and programmed:

to control the capture of an image of the fingerprint by controlling the light source 4 and the sensor 5;

to extract characteristics from the image of the fingerprint and to encode them; and to compare the characteristics as encoded in this way with the characteristics stored in the memory 13.

The control unit 7 also includes a memory 15 containing signatures that result from reference optical characteristics of the control unit 7. The reference optical characteristics are captured by the sensor 5 during a step of initializing the device. Each signature corresponds to a configuration for lighting the LEDs 12. The various lighting configurations depend on the light intensities, the wavelengths, and the distribution of the LEDs 12 that are switched on. By way of example, each signature is constituted:

by the set of optical characteristics detected by the sensor for the lighting configuration concerned;

by a selection of optical characteristics, e.g. as a function of the zones of the sensor where they were detected;

by numerical information extracted from the optical characteristics (e.g. a mean contrast ratio, a frequency, an intensity, . . . ) or calculated, e.g. as a function of a geographical distribution of brightness levels; . . . .

The processor module 14 is arranged to form a comparator module for comparing:

a signature that results from the optical characteristics of the control unit 7 as captured by the sensor 5 with one of the predetermined lighting configurations for the diodes 12; and stored visual reference characteristics corresponding to the lighting configuration.

The control unit 7, the sensor 5, and the light source 4 are connected to an electrical power supply that is not shown in the figures.

When the capture device is started, and/or periodically, the processor module 14 controls the sensor 5 and the diodes 12 to obtain the optical characteristics of the control unit with a predetermined lighting configuration. Preferably, the same lighting configuration is not used twice in succession.

The processor module 14 extracts the signature of the detected optical characteristics and compares it with the signature stored for the same lighting configuration.

If the result of the comparison is positive, then the capture device continues to operate normally.

If the result of the comparison is negative, then the processor module 14 causes operation of the capture device to be stopped.

The reflecting facets 9 of the reflector member 8 form angles between one another so as to provide the sensor 5 with simultaneous views of the control unit 7 at different viewing angles. The optical characteristics detected by the sensor 5 are thus not constituted by a true image of the control unit 7, but rather by an image made up of partial images with different viewing angles.

Elements that are identical or analogous to those described above are given the same numerical references in the description below of variant embodiments shown in FIGS. 3 to 5.

Figure 3:
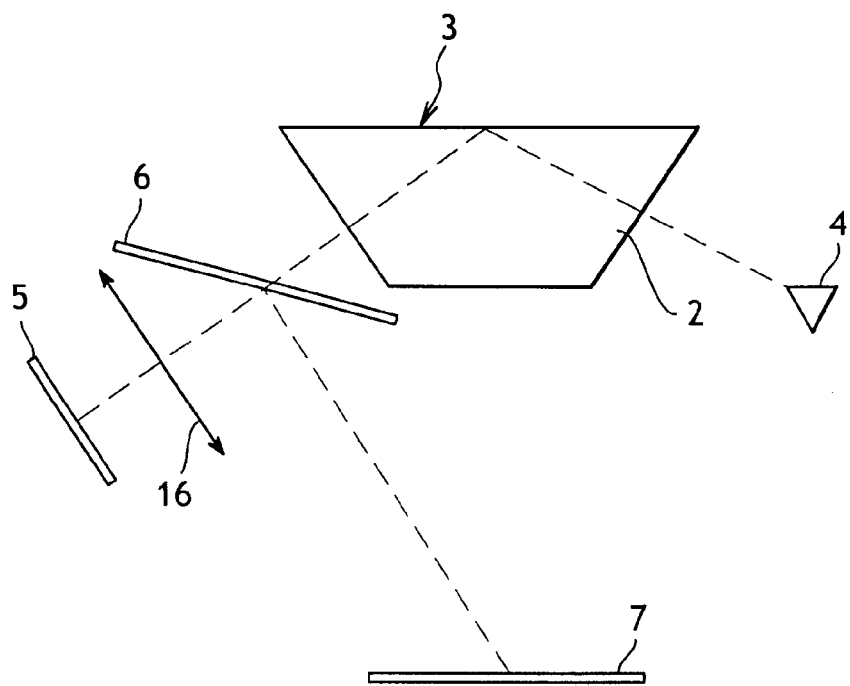
FIG. 3 is a view analogous to FIG. 1 showing a first variant embodiment of the device.

In a first variant as shown in FIG. 3, the sensors 5, the optical focusing element 16, and the mirror 6 are placed in succession facing a side face of the prism so that the sensor 5 has a field of view covering both the detection zone 3 of the prism 2 and the top surface of the control unit 7 that is placed under the prism 2. The light source 4 is placed facing the other side of the prism 2 in order to eliminate the detection zone 3. The various components of the device are placed in such a manner that the detection zone 3 and the top surface of the control unit 7 coincide with the surface of the sensor 5 via the optical focusing element 16.

This embodiment variant is particularly simple.

Figure 4:
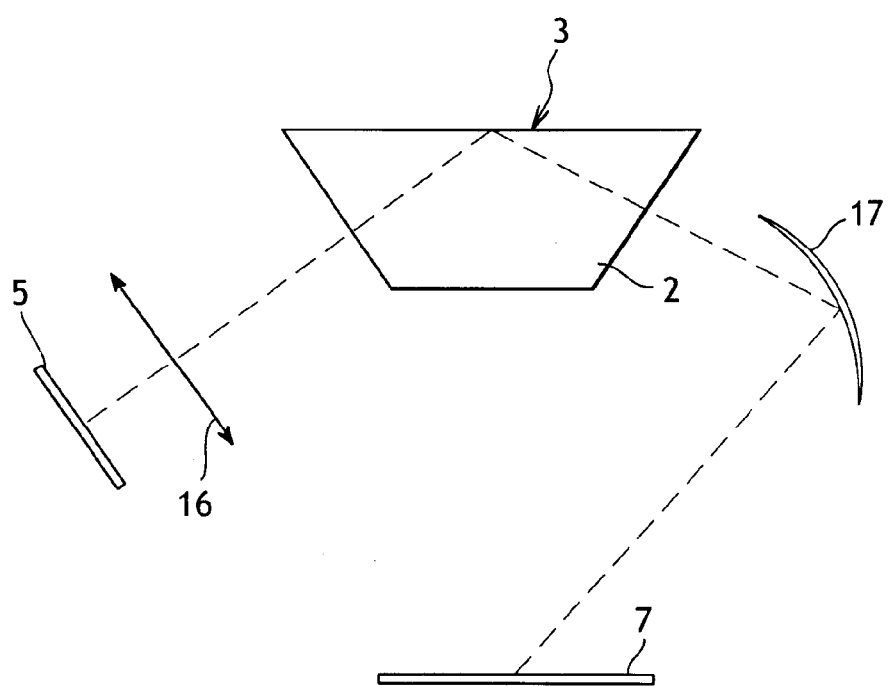
FIG. 4 is a view analogous to that of FIG. 1 showing a second variant embodiment of the device.

In a second embodiment variant shown in FIG. 4, the sensor 5 and the optical focusing element 16 are disposed in succession facing one of the side faces of the prism 2 so that the detection zone 3 is covered by the field of view of the sensor 5. A mirror 17 that presents optical power is placed facing the opposite side face of the prism 2 so as to reflect the top surface of the control unit 7 placed under the prism 2 onto the sensor 5 via the optical element 16 and the prism 2.

Figure 5:
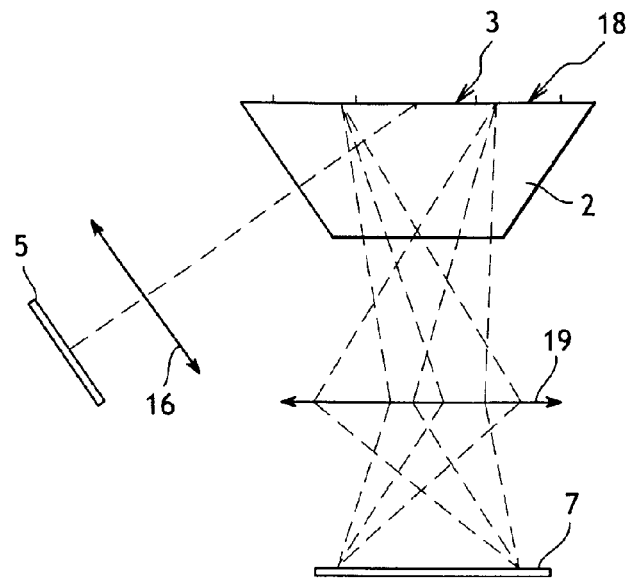
FIG. 5 is a view analogous to that of FIG. 1 showing a third variant embodiment of the device.

In a third embodiment variant, as shown in FIG. 5, the detection zone 3 of the prism 2 is surrounded by a reflecting surface 18 lying in the field of view of the sensor 5, which, together with an optical focusing element 16, is placed facing a side face of the prism 2. The control unit 7 and an optical focusing element 19 are disposed in succession facing the bottom face of the prism 2 so that portions of the control unit 7 are reflected in focus in the reflecting border 18.

Thus, the sensor 5 detects simultaneously (or in a variant sequentially) optical characteristics of the fingerprint appearing in the detection zone 3 and optical characteristics of portions of the control unit 7 reflected in the reflecting border 18.

In the description below of a second embodiment, elements that are identical or analogous to those described above are given the same references.

Figure 6:
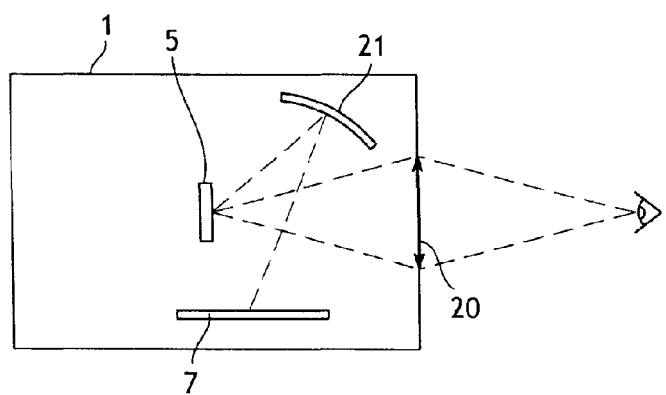
FIG. 6 is a diagrammatic view analogous to that of FIG. 1 showing a capture device in a second embodiment.

With reference to FIG. 6, the device constituting the second embodiment is arranged to provide identification by iris recognition.

The device comprises a casing 1, a sensor 5, and a control unit 7. An optical focusing element 20 is mounted on the casing 1 facing the sensor 5 in such a manner that a sharp image of an iris of a candidate for identification is formed on the sensor 5.

A focusing mirror 21 is also placed in the field of view of the sensor 5 to reflect at least a portion of the control unit 7 towards the sensor 5.

Thus, the field of view of the sensor 5 includes: the detection zone (zone where the iris is situated behind the optical focusing element 20); and a portion of the control unit 7 reflected by the focusing mirror 21. The operation of the device is identical to that of the first embodiment.

Figure 7:
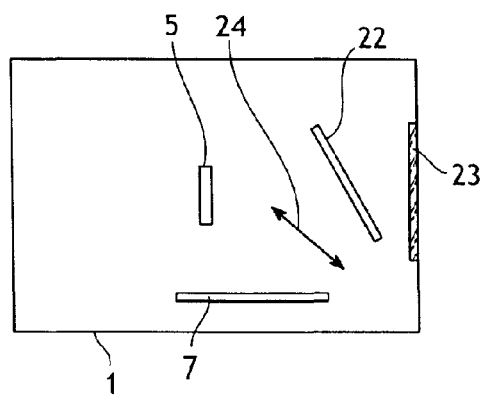
FIGS. 7 and 8 are views analogous to FIG. 6 showing first and second variants of the second embodiment.

In a first variant (see FIG. 7), a semi-reflecting plate or mirror 22 is placed between the sensor 5 and a porthole 23 mounted in the casing 1 between the sensor 5 and the detection zone. The mirror 22 is analogous to the mirror 6 and is placed so as to reflect at least a portion of the control unit 7 to the sensor 5. The optical focusing element 24 in this example is mounted between the mirror 22 and the control unit 7 so as to enable a sharp image to be formed on the sensor 5. The optical focusing element 24 is optional. The porthole 23 may be replaced by an optical focusing element 20.

Figure 8:
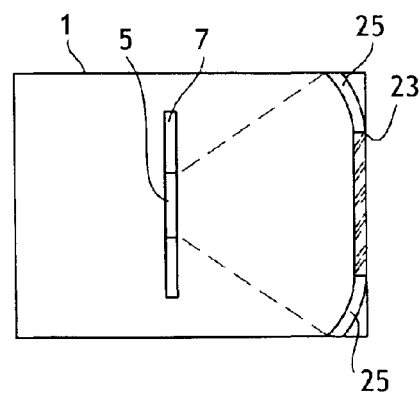

In a second variant shown in FIG. 8, the porthole 23 that is mounted on the casing 1 between the sensor 5 and the detection zone is surrounded by a reflecting zone 25 shaped to reflect an image of the control unit 7 to the sensor 5, which control unit in this example is mounted in the vicinity of the sensor 5, in the focal plane of the reflecting zone 25.

Naturally, the invention is not limited to the embodiments described but covers any variant coming within the ambit of the invention as defined by the claims.

In particular, the control unit may be placed in the immediate vicinity of the fingerprint detection zone. It is possible to replace the control unit in the field of view of the sensor after reflection on a peripheral portion of the prism.

The reflecting member may be omitted or may be in the form of a kaleidoscope, or may have a shape that is curved, or a semi-enclosing shape that may be open or closed, or any other shape, in particular presenting two reflecting portions of identical or different shapes that form an angle between each other so as to form two viewing angles, . . . . The lens may have special optical properties making it possible to emphasize, enlarge, or mask portions of the control unit. The lens is likewise optional.

The protective layer may be omitted or it may be of some other composition, and for example it may be: solid or include a viscous phase and a solid phase, it may be opaque, it may incorporate phosphorescent elements, . . . .

The memory containing the reference optical characteristics or signatures may either be connected permanently to the control unit or else it may be associated therewith temporarily (the reference optical characteristics or signatures may be stored in a magnetic card or an integrated circuit card, an electronic key, . . . ), or it may be remote from the control unit and connected thereto via a wired or wireless connection.

The module for comparing visual characteristics may be independent of the comparison module used for identification by fingerprint recognition, and may for example be constituted by the integrated circuit of an integrated circuit card.

The device need have only one element for illuminating the control unit. The LEDs 12 may be placed on the surface of the control unit 7.

The invention can be used with "print" capture devices in the general meaning of this term, i.e. fingerprints, iris prints (iris recognition), face prints (face recognition), . . . .

The positions of the prism 2 and the control unit 7 may be interchanged.

25

What is claimed is:

1. A device for capturing biometric characteristics, the device comprising an optical sensor having a field of view covering a detection zone for detecting optical characteristics, and an electronic control unit that is connected to the optical sensor in order to control it, wherein the electronic control unit is placed at least in part in the field of view of the optical sensor and includes a memory containing at least one signature resulting from at least one reference optical characteristic of the electronic control unit as seen by the optical sensor, and a comparator module for comparing the signature with at least one corresponding signature that results from at least one optical characteristic of the electronic control unit as supplied by the optical sensor.

2. The device according to claim 1, wherein the comparator module is also arranged to compare biometric characteristics extracted from images provided by the optical sensor with stored biometric characteristics.

3. The device according to claim 1, including a mirror placed between the optical sensor, the electronic control unit, and the detection zone, and arranged to enable the electronic control unit and the detection zone to be viewed, one in reflection and the other in transmission.

4. The device according to claim 3, wherein the mirror is a semi-reflecting mirror.

5. The device according to claim 1, including a reflecting member surrounding at least part of the electronic control unit.

6. The device according to claim 5, wherein the reflecting member comprises a plurality of reflecting facets forming angles between one another so as to provide the optical sensor with different angles of view of the electronic control unit.

7. The device according to claim 1, including a lens disposed between the electronic control unit and the optical sensor to focus an image of the electronic control unit on the optical sensor.

8. The device according to claim 1, wherein the electronic control unit is covered in a protective layer having optical characteristics that are detectable by the optical sensor.

9. The device according to claim 8, wherein the protective layer is made of a non-opaque material incorporating optically detectable elements.

10. The device according to claim 9, wherein the optically active elements comprise reflecting flakes.

11. The device according to claim 10, including at least one lighting element for lighting the electronic control unit, the element being embedded in the protective layer.

12. The device according to claim 8, wherein the protective layer is made of a viscous material.

13. The device according to claim 1, wherein the comparator module is arranged to perform a comparison each time the device is started.

14. The device according to claim 1, wherein the comparator module is arranged to perform a comparison periodically.

15. The device according to claim 1, including a plurality of lighting elements for lighting the electronic control unit and controlled by the comparator module to take on different configurations, each corresponding to at least one stored signature.

16. The device according to claim 1, wherein the memory contains a plurality of signatures resulting from a plurality of reference optical characteristics, and the comparator module is arranged to select a stored signature, to isolate the corresponding optical characteristics from amongst those detected by the optical sensor, and to compare at least one signature resulting from the optical characteristics detected by the optical sensor with the selected stored signature.

17. The device according to claim 1, wherein the electronic control unit is arranged to prevent the device from operating when the comparison gives a negative result.

* * * * *